Patented July 17, 1928.

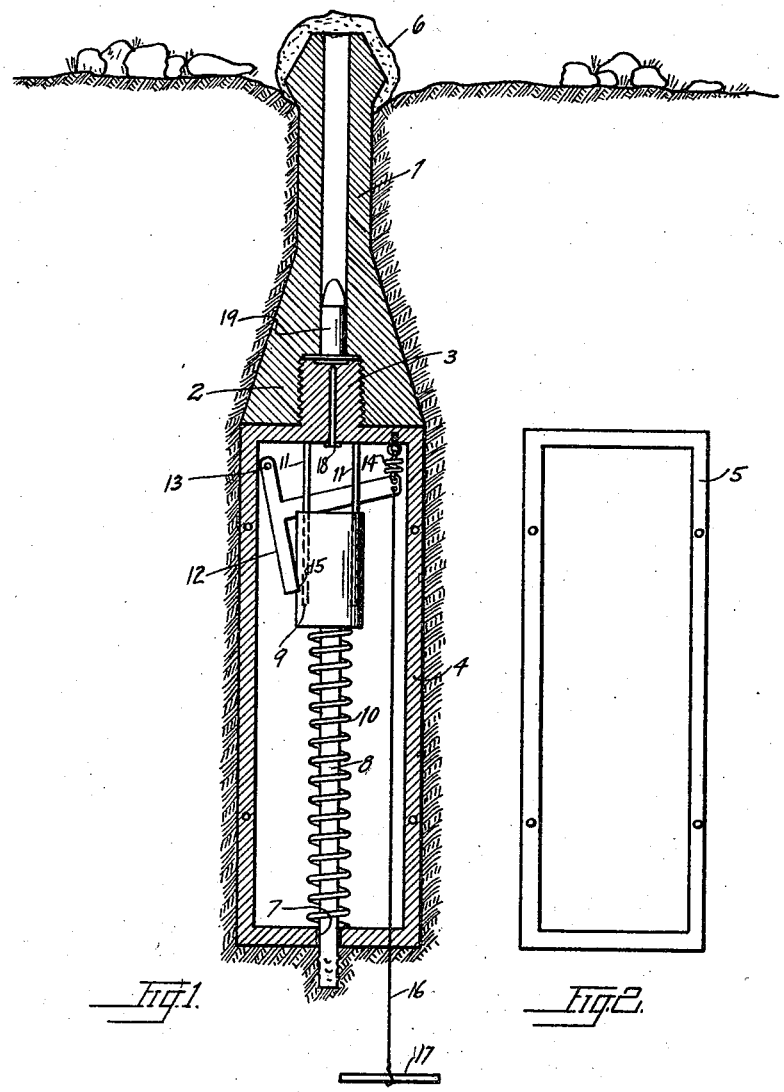

1,677,394

UNITED STATES PATENT OFFICE.

ALBIN MAKI, OF TOIVOLA, MICHIGAN.

TRAP GUN.

Application filed August 23, 1924. Serial No. 733,758.

This invention relates to improvements in animal trap-guns adapted primarily for destroying predatory and other animals by the self-destruction method. Simplicity in construction and efficiency in operation are objects attained.

With the foregoing and other objects in view the invention consists in the combination and arrangement of parts to be hereinafter fully described, pointed out in the appended claim and illustrated in the accompanying drawing which forms a part of this application and in which—

Fig. 1 is a longitudinal sectional view of my trap-gun in set position.

Fig. 2 is a view of the casing cover.

Like reference characters denote corresponding parts in both views.

The trap consists primarily of a barrel 1 having one flared end 2 formed with a threaded recess to receive the threaded stem 3 of a casing 4 which casing is preferably oblong in shape, substantially square in cross section, and has one open face adapted to be closed by the removable side piece or cover 5. The casing and barrel in assembled position are adapted to be imbedded in a pit of soft earth, as shown in Fig. 1, the earth then being lightly tamped about them so that only the upper end of the barrel shows above the ground and upon this protruding end the bait 6 is fastened.

The base of the casing is formed with a perforation 7 through which the stem 8 of a hammer or weight 9 extends into the earth pit, or ground, and an expansion coil spring 10 encircling said stem abuts the hammer and the base of the casing and tends yieldingly to force the hammer toward the upper end of the casing, said hammer being recessed or perforated to receive the parallel guide rods 11 that depend into the casing from the upper end thereof.

A trigger 12 is fulcrumed to the casing upon a pin 13, one end of said trigger being connected by a contractile spring 14 to the upper end of the casing whereby a toe-portion 15 of the trigger is yieldingly retained in a notched portion of the hammer 9 to prevent the hammer being forced to the upper end of the casing by the spring 10. A wire 16 also connected to said trigger adjacent the spring 14 is secured to an anchor 17 imbedded in the pit, the adjustment of the parts secured to the trigger being such that the trigger will be retained in engagement with the hammer, as shown, unless the casing 4 is disturbed.

A firing pin 18 is disposed in a perforation in the stem 3 of the casing, the point of said pin being in contact with the explosive shell 19 secured to the upper end of the stem 3 and projecting into the bore of the barrel 1. In Fig. 1 the trap-gun is shown in set position with the bait 6 attractively displayed to such animals as may approach it. Should an animal seize the bait in his mouth he will also seize the upper end of the barrel 1 and in tugging at the bait he will disturb and partially uproot the barrel and casing causing a pull upon the wire 16 which will draw the trigger out of engagement with the hammer permitting the spring 10 to drive it against the upper end of the casing into engagement with the firing pin and so cause the same to explode the shell 19 and the cartridge therefrom to pierce the mouth or head of the animal thus wounding or killing him. The trap is reset by removing the barrel 1 and placing shell, and by pulling back stem 8 of the hammer 9.

What is claimed is:—

A trap-gun comprising a casing, a cone-shaped barrel member detachably mounted upon the casing, the larger end of the barrel member being of the same diameter as the adjacent end of the casing, the barrel member being provided at its upper end with an externally disposed enlargement adapted to form a bait holder, the bore of the barrel member adapted to receive a cartridge, a pin movably mounted in the casing, a spring supported weight held in the casing, a trigger pivoted in the casing and engageable with the weight to hold the same away from the pin and against the tension of the spring and a cord connected with the trigger and passing through the end of the casing and having an anchor adapted to be embedded in the earth.

In testimony that I claim the foregoing as my own I have hereto affixed my signature.

ALBIN MAKI.